US012808852B2

(12) United States Patent
Sauter et al.

(10) Patent No.: US 12,808,852 B2
(45) Date of Patent: Nov. 24, 2026

(54) VISUAL COMPARISON OF CHROMATOGRAPHY RESULTS

(71) Applicant: Dionex Softron GmbH, Germering (DE)

(72) Inventors: Peter Sauter, Germering (DE); Christian Klimm, Germering (DE)

(73) Assignee: Dionex Softron GmbH, Germering (DE)

( * ) Notice: Subject to any disclaimer, the term of this patent is extended or adjusted under 35 U.S.C. 154(b) by 347 days.

(21) Appl. No.: 18/569,491

(22) PCT Filed: Jun. 24, 2022

(86) PCT No.: PCT/EP2022/067422
§ 371 (c)(1),
(2) Date: Dec. 12, 2023

(87) PCT Pub. No.: WO2022/269074
PCT Pub. Date: Dec. 29, 2022

(65) Prior Publication Data
US 2024/0264129 A1 Aug. 8, 2024

Related U.S. Application Data

(60) Provisional application No. 63/215,341, filed on Jun. 25, 2021.

(51) Int. Cl.
*G01N 30/86* (2006.01)

(52) U.S. Cl.
CPC ..... *G01N 30/8631* (2013.01); *G01N 30/8675* (2013.01)

(58) Field of Classification Search
CPC ........... G01N 30/8631; G01N 30/8675; G01N 30/8696
See application file for complete search history.

(56) References Cited

U.S. PATENT DOCUMENTS 8,838,397 B1 9/2014 Schibler et al.
11,460,455 B2 * 10/2022 Nyholm ................. G01N 30/86
(Continued)

FOREIGN PATENT DOCUMENTS

CA 2356950 A1 7/2000
JP 2017-207449 A 11/2017
(Continued)

OTHER PUBLICATIONS

International Search Report and Written Opinion for International Application No. PCT/EP2022/067422 dated Dec. 29, 2022.
(Continued)

*Primary Examiner* — Lindsay M Maguire

(57) ABSTRACT

Disclosed herein are scientific instrument support systems, as well as related methods, computing devices, and computer-readable media. For example, in some embodiments, a scientific instrument support apparatus includes a first logic to obtain chromatographic data sets from a chromatographic system; a second logic to perform a first analysis of the one or more chromatographic data sets to generate a first result perform a second analysis of the one or more chromatographic data sets to generate a second result; and a third logic to identify differences between the first result and the second result; provide a user interface configured to indicate the data sets where the second result differs from the first result; and display one or more chromatograms representative of the indicated data sets and visually identifying features on the chromatograms where the differences occur.

21 Claims, 9 Drawing Sheets

(56) References Cited

U.S. PATENT DOCUMENTS

| | | | | |
|---|---|---|---|---|
| 2002/0010566 | A1* | 1/2002 | Chester .............. | G01N 30/8693 703/2 |
| 2011/0144923 | A1* | 6/2011 | Gallagher .......... | G01N 30/8651 702/32 |
| 2014/0078182 | A1* | 3/2014 | Utsunomiya ............ | G09G 5/37 345/666 |
| 2017/0322190 | A1 | 11/2017 | Nyholm et al. | |
| 2020/0340961 | A1* | 10/2020 | Kunimura .......... | G01N 30/8679 |

FOREIGN PATENT DOCUMENTS

| | | | |
|---|---|---|---|
| JP | 2017-534060 | A | 11/2017 |
| JP | 2020-180826 | A | 11/2020 |
| WO | 2020/194827 | A1 | 10/2010 |
| WO | 2017/098661 | A1 | 6/2017 |

OTHER PUBLICATIONS

Notice of Reasons for Refusal received for Japanese Patent Application Serial No. 2023-579110 dated Jan. 20, 2026, 6 pages(Including English Translation).

Fasciotti et al., "Optimization and Application of Methods of Triacylglycerol Evaluation for Characterization of Olive Oil Adulteration by Soybean Oil with HPLC-APCI-MS-MS", Talanta, vol. 81, 2010, pp. 1116-1125.

Hollingsworth et al., "Comparative Visualization for Comprehensive Two-Dimensional Gas Chromatography", Journal of Chromatography A, vol. 1105, 2006, pp. 51-58.

* cited by examiner

TO FIG. 8B

FROM FIG. 8A

| | A | B | C | D | E | F | G | H | I | J | K | L |
|---|---|---|---|---|---|---|---|---|---|---|---|---|
| 1 | PEAK | PEAK NAME | RET. TIME | AMOUNT | REL.AREA | AREA | HEIGHT | TYPE | WIDTH (50%) | ASYM. | RESOL. | PLATES |
| 2 | NO. | | MIN | MOLE % | % | mV'MIN | mV | | MIN | EP | EP | EP |
| 4 | 1 | | 0.703 | N.A. | 0.00 | 0.0008 | 0.03 | BMB* | 0.028 | 1.06 | 2.71 | 3415 |
| 5 | 2 | NITROGEN | 0.860 | 0.0714 | 0.09 | 0.0235 | 0.55 | BMB* | 0.040 | 1.07 | 9.19 | 2562 |
| 6 | **3** | **HEXANES PLUS** | **2.282** | **0.0076** | **0.02** | **0.0064** | **0.04** | **BMB** | **0.143** | **1.04** | **8.08** | **1418** |
| 7 | **4** | AIR | 3.713 | N.A. | 0.09 | 0.0247 | 0.33 | BM* | 0.066 | 1.17 | 2.36 | 17284 |
| 8 | **5** | METHANE | 4.025 | 96.9805 | 95.73 | 25.8719 | 267.13 | BMB | 0.089 | 1.90 | 7.09 | 11239 |
| 9 | **6** | ETHANE | 5.243 | 2.3627 | 3.72 | 1.0046 | 8.02 | BMB | 0.114 | 1.17 | 7.53 | 11817 |
| 10 | | | | | | | | | | | | |
| 11 | 7 | PROPANE | 7.042 | **0.1197** | **0.24** | **0.0642** | 0.35 | **BMB** | **0.168** | **1.09** | **6.22** | **9696** |
| 12 | 8 | i-BUTANE | 9.168 | 0.0160 | 0.04 | 0.0101 | 0.04 | BMB | 0.235 | 1.09 | 3.50 | 8403 |
| 13 | 9 | n-BUTANE | 10.685 | 0.0192 | 0.05 | 0.0122 | 0.04 | BMB | 0.275 | 1.04 | 7.64 | 8339 |
| 14 | 10 | i-PENTANE | 15.335 | 0.0073 | 0.02 | 0.0050 | 0.01 | BMB | 0.443 | 0.98 | 3.26 | 6650 |
| 15 | 11 | n-PENTANE | 17.258 | 0.0029 | 0.01 | 0.0021 | 0.01 | BMB | 0.254 | 1.21 | N.A. | 25510 |
| 16 | MAXIMUM | | | 96.9805 | 95.73 | 25.8719 | 267.03 | | 0.443 | 1.90 | 9.19 | 25510 |
| 17 | MINIMUM | | | 0.0029 | 0.00 | 0.0008 | 0.01 | | 0.028 | 0.98 | 2.36 | 1418 |
| 18 | SUM | | | 99.5873 | 100.00 | 27.0256 | 276.56 | | | | | |
| 19 | | | | | | | | | | | | |

908

TO FIG. 9B

FIG. 9A

| A | B | C | D | E | F | G | H | I | J | K | L |
|---|---|---|---|---|---|---|---|---|---|---|---|
| PEAK NO. | PEAK NAME | RET. TIME MIN | AMOUNT MOLE % | REL.AREA % | AREA MV*MIN | HEIGHT MV | TYPE | WIDTH (50%) MIN | ASYM. EP | RESOL. EP | PLATES EP |
| 1 | | 0.703 | N.A. | 0.00 | 0.0008 | 0.03 | BMB* | 0.028 | 1.06 | 2.71 | 3415 |
| 2 | NITROGEN | 0.860 | 0.0714 | 0.08 | 0.0235 | 0.55 | BMB* | 0.040 | 1.07 | 31.62 | 2562 |
| **3** | AIR | 3.713 | N.A. | 0.09 | 0.0247 | 0.33 | BM* | 0.066 | 1.17 | 2.36 | 17284 |
| **4** | METHANE | 4.025 | 96.9805 | 89.91 | 25.8719 | 267.13 | BMB | 0.089 | 1.90 | 7.09 | 11239 |
| **5** | ETHANE | 5.243 | 2.3627 | 3.49 | 1.0046 | 8.02 | BMB | 0.114 | 1.17 | N.A. | 11817 |
| **6** | | **6.523** | **NA** | **6.11** | **1.7574** | **8.24** | **BM*** | **N.A.** | **N.A.** | **N.A.** | **N.A.** |
| 7 | PROPANE | 7.042 | **0.1155** | **0.22** | **0.0620** | 0.35 | **BMB*** | **0.167** | **1.06** | **6.24** | **9856** |
| 8 | i-BUTANE | 9.168 | 0.0160 | 0.04 | 0.0101 | 0.04 | BMB | 0.235 | 1.09 | 3.50 | 8403 |
| 9 | n-BUTANE | 10.685 | 0.0192 | 0.04 | 0.0122 | 0.04 | BMB | 0.275 | 1.04 | 7.64 | 8339 |
| 10 | i-PENTANE | 15.335 | 0.0073 | 0.02 | 0.0050 | 0.01 | BMB | 0.443 | 0.98 | 3.26 | 6650 |
| 11 | n-PENTANE | 17.258 | 0.0029 | 0.01 | 0.0021 | 0.01 | BMB | 0.254 | 1.21 | N.A. | 25510 |
| MAXIMUM | | | 96.9805 | 89.91 | 25.8719 | 267.03 | | 0.443 | 1.90 | 31.62 | 25510 |
| MINIMUM | | | 0.0029 | 0.00 | 0.0008 | 0.01 | | 0.028 | 0.98 | 2.36 | 2562 |
| SUM | | | 99.5796 | 100.00 | 28.7766 | 284.75 | | | | | |

902
904
906

FROM FIG. 9A

FIG. 9B

VISUAL COMPARISON OF CHROMATOGRAPHY RESULTS

CROSS-REFERENCE TO RELATED APPLICATIONS

The subject patent application is a U.S. National Stage filing under 35 U.S.C. § 371 of international patent cooperation treaty (PCT) application No. PCT/EP2022/067422, filed Jun. 24, 2022, and entitled "VISUAL COMPARISON OF CHROMATOGRAPHY RESULTS", which applications claim the benefit of priority from U.S. Provisional Patent Application No. 63/215,341, filed Jun. 25, 2021, and entitled "VISUAL COMPARISON OF CHROMATOGRAPHY RESULTS," the entireties of which priority applications are hereby incorporated by reference herein.

FIELD

The present disclosure generally relates to the field of gas chromatography including visual comparison of chromatography results.

INTRODUCTION

Chromatography can be used to separate and analyze components of a complex sample. Various algorithms are available for analyzing the resulting chromatographic data and may produce different results.

BRIEF DESCRIPTION OF DRAWINGS

For a more complete understanding of the principles disclosed herein, and the advantages thereof, reference is now made to the following descriptions taken in conjunction with the accompanying drawings, in which:

FIGS. 7, 8*a*, 8*b*, 9*a* and 9*b* are illustrations of an exemplary graphical user interface elements identifying differences between the results from two different analyses of chromatographic data.

Figure 1:
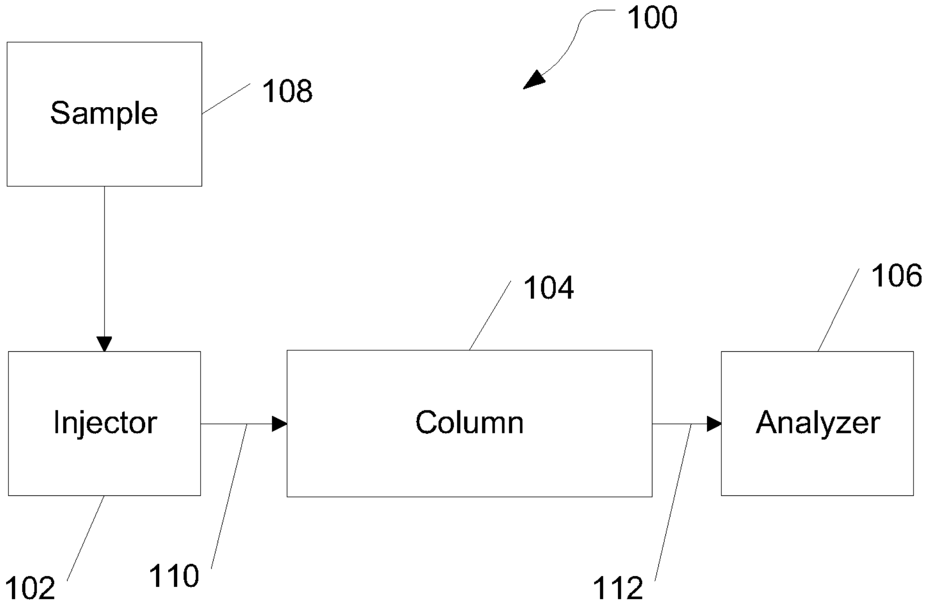
FIG. 1 is a diagram of an exemplary chromatography system.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Disclosed herein are scientific instrument support systems, as well as related methods, computing devices, and computer-readable media. For example, in some embodiments, a scientific instrument support apparatus includes a first logic to obtain one or more chromatographic data sets from a chromatographic system, each chromatographic data set representing an injection of a sample and separation of the sample by chromatographic methods; a second logic to perform a first analysis of the one or more chromatographic data sets using a first set of algorithms and a first set of analysis parameters to generate a first result perform a second analysis of the one or more chromatographic data sets using a second set of algorithms and a second set of analysis parameters to generate a second result; and a third logic to identify differences between the first result and the second result; and provide a user interface configured to indicate the data sets where the second result differs from the first result; and display one or more chromatograms representative of the indicated data sets and visually identifying features on the chromatograms where the differences occur.

The scientific instrument support embodiments disclosed herein may achieve improved performance relative to conventional approaches. For example, manual comparison of the changes in an analysis of chromatographic data as a result in changes in user selectable algorithms and parameters can be difficult and tedious. Identification of these areas of change in a graphical user interface can speed the understanding of the effect of these changes.

The section headings used herein are for organizational purposes only and are not to be construed as limiting the described subject matter in any way.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device or collection of devices. The drawings are not necessarily to scale.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

A "system" sets forth a set of components, real or abstract, comprising a whole where each component interacts with or is related to at least one other component within the whole.

FIG. 1 illustrates a typical chromatograph system 100. In various embodiments, chromatography system 100 can be a gas chromatography system, a liquid chromatography system, an ion chromatography system, or the like. The system includes an injector 102, a column 104, and a detector 106. A sample 108 can be supplied to the injector 102. In various embodiments, the sample 108 can be a liquid sample. In other embodiments, the sample 108 can be a gaseous sample, such as for head space analysis. In an LC or IC system, the injector 102 can include sample loop or concentrator column into which at least a portion of the sample 108 can be loaded. In various embodiments of a GC system, the injector 102 can vaporize at least a portion of a liquid sample 108 into the gas phase. The sample 108 can be moved from the injector to the column 104 by flowing an eluent through the injector to move the sample 108 into the column 104. The column 104 includes a retention medium. In various embodiments, the retention medium can be a thin coating on the interior surface of the column 104. Alternatively, the retention medium can be in the form of beads or the like that are packed into the interior of the column 104. The retention medium can differentially retain some compounds from the sample 108 such that the amount of time necessary to transit the column is compound dependent. In this way, the compounds in the sample 108 can be separated based on the time to transit the column (retention time).

Upon exiting the column 104, the compounds can enter the detector 106. Various detectors can be used as part of a chromatography system including ultraviolet/visible detectors, infrared detectors, flame ionization detectors, nitrogen phosphorous detectors, electron capture detectors, thermal conductivity detectors, flame photometric detectors, mass spectrometers, and the like.

Figure 2:
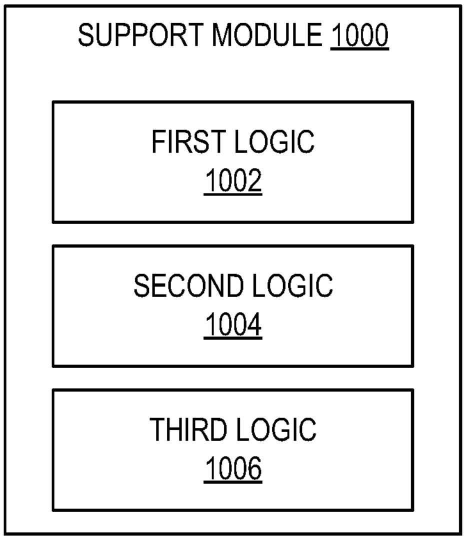
FIG. 2 is a block diagram of an example scientific instrument support module for performing support operations, in accordance with various embodiments.

FIG. 2 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 4000 of FIG. 5, and examples of systems of interconnected computing devices, in which the scientific instrument support module 1000 may be implemented across one or more of the computing devices, is discussed herein with reference to the scientific instrument support system 5000 of FIG. 6.

The scientific instrument support module 1000 may include first logic 1002, second logic 1004, and third logic 1006. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices.

The first logic 1002 may obtain chromatography data from chromatography system 100. This may include instructing chromatography system 100 to perform an analysis on one or more samples. Additionally, first logic 1002 can store the chromatography data provided by chromatography system 100 in a database or filesystem and retrieve the chromatography data therefrom as needed.

The second logic 1004 may analyze the chromatography data. In various embodiments, second logic 1004 can determine baselines, apply smoothing, identify peaks, integrate peak areas, perform peak matching, and the like. In various embodiments, the second logic 1004 can store the results of the analyses in a database, file system, or other storage.

The third logic 1006 may provide output of the results of the analysis performed by second logic 1004 to the user. The output can be in the form of a chromatogram, a peak table, and the like. Additionally, third logic 1006 can provide a comparison between results of different analysis performed by the second logic 1004. In various embodiments, changes to the algorithms used by the second logic 1004 during the analysis or changes to parameters used by the algorithms of the second logic 1004 can results in small deviations to portions of the chromatograms. Third logic 1006 can compare the results of the two or more analyses and graphically identify those changes to the user.

Figure 3:
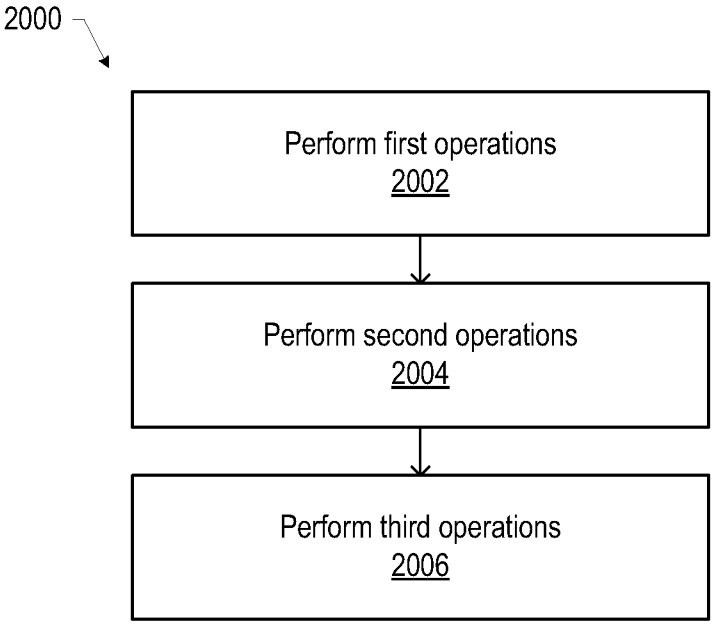
FIG. 3 is a flow diagram of an example method of performing support operations, in accordance with various embodiments.

FIG. 3 is a flow diagram of a method 2000 of performing support operations, in accordance with various embodiments. Although the operations of the method 2000 may be illustrated with reference to particular embodiments disclosed herein (e.g., the scientific instrument support modules 1000 discussed herein with reference to FIG. 2, the GUI 3000 discussed herein with reference to FIG. C, the computing devices 4000 discussed herein with reference to FIG. 5, and/or the scientific instrument support system 5000 discussed herein with reference to FIG. 5), the method 2000 may be used in any suitable setting to perform any suitable support operations. Operations are illustrated once each and in a particular order in FIG. 3, but the operations may be reordered and/or repeated as desired and appropriate (e.g., different operations performed may be performed in parallel, as suitable).

At 2002, first operations may be performed. For example, the first logic 1002 of a support module 1000 may perform the operations of 2002. The first operations may include obtaining chromatography data from a chromatography system. Obtaining the chromatography data can include instructing the chromatography system to perform a chromatographic separation of one or more samples and receiving the resulting chromatography data from the chromatography system. Additionally, the chromatography data can be stored in a database, a file system, or other storage mechanism for later retrieval.

At 2004, second operations may be performed. For example, the second logic 1004 of a support module 1000 may perform the operations of 2004. The second operations may include analyzing the chromatography data. In various embodiments, analyzing the chromatography data can include determining baselines, applying smoothing, detecting peaks, integrating peak areas, performing peak matching, and the like. In various embodiments, the results of the analyses can be stored in a database, a file system, or other storage.

The second operations can utilize a variety of algorithms for the various analyzing steps. In some embodiments, the user can select from multiple options for performing one of the analyzing steps. For example, the user can choose between two or more algorithms to determine the baseline. Additionally, the user may be able to modify parameters for the various algorithms. In some cases, changes to the parameters or algorithms can result in small changes to the resulting analysis, such as changes to retention time from a change to a peak detection algorithm, changes to peak areas from changes to the baseline determining algorithm or the peak integration algorithm, and the like. Understanding these changes can be difficult and can require a pairwise comparison of the resulting analyses.

At 2006, third operations may be performed. For example, the third logic 1006 of a support module 1000 may perform the operations of 2006. The third operations may include performing a comparison between two analyses of the same chromatographic data to identify changes in the results from differences in parameters or algorithms used for the two analyses. The third operations may include providing a graphic user interface displaying the results of the analyses and visually identifying the points of difference to the user, such as by highlighting differences in a table or highlighting differences in a chromatogram.

Figure 5:
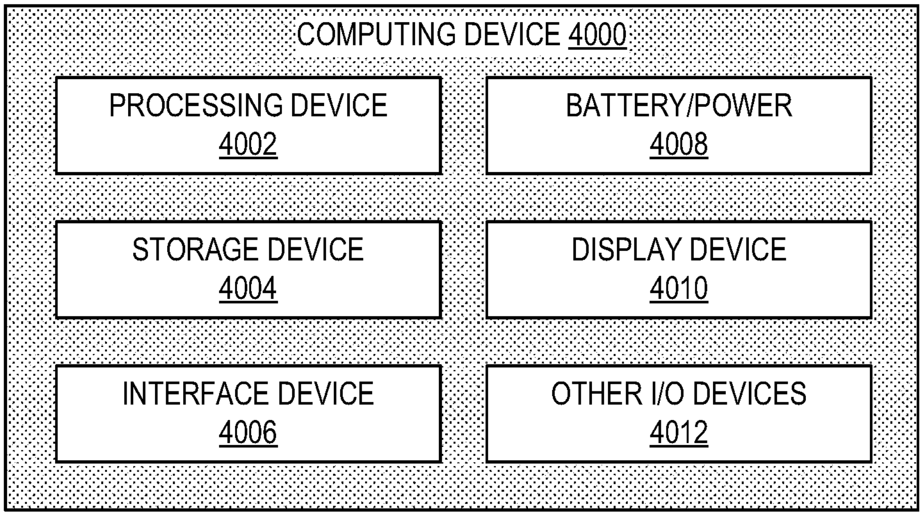
FIG. 5 is a block diagram of an example computing device that may perform some or all of the scientific instrument support methods disclosed herein, in accordance with various embodiments.
Figure 6:
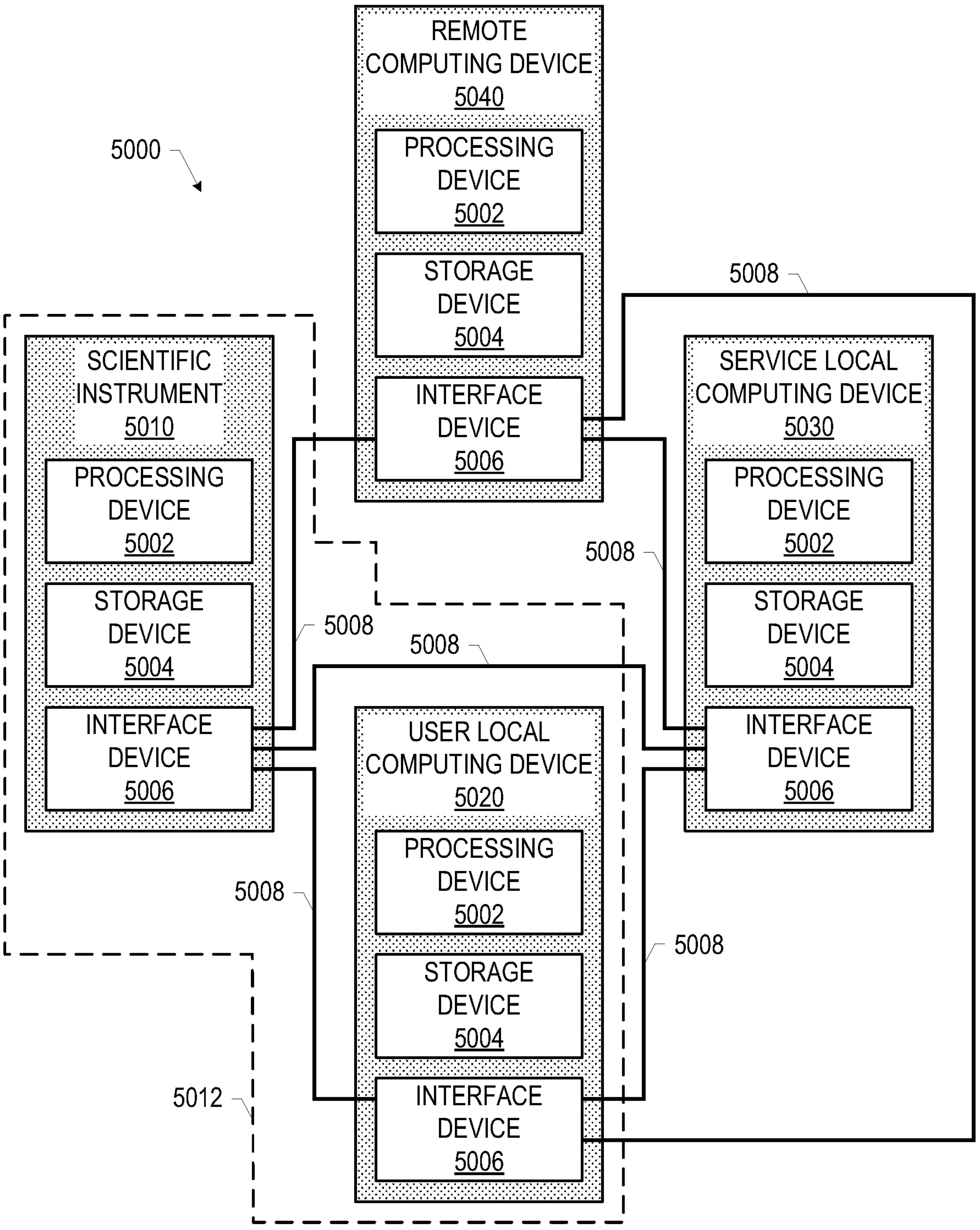
FIG. 6 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 5020 discussed herein with reference to FIG. 6). These interactions may include providing information to the user (e.g., information regarding the operation of a scientific instrument such as the scientific instrument 5010 of FIG. 6, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 6, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 5) that provides outputs to the user and/or prompts the user to provide inputs (e.g., via one or more input devices, such as a keyboard, mouse, trackpad, or touchscreen, included in the other I/O devices 4012 discussed herein with reference to FIG. 5). The scientific instrument support systems disclosed herein may include any suitable GUIs for interaction with a user.

Figure 4:
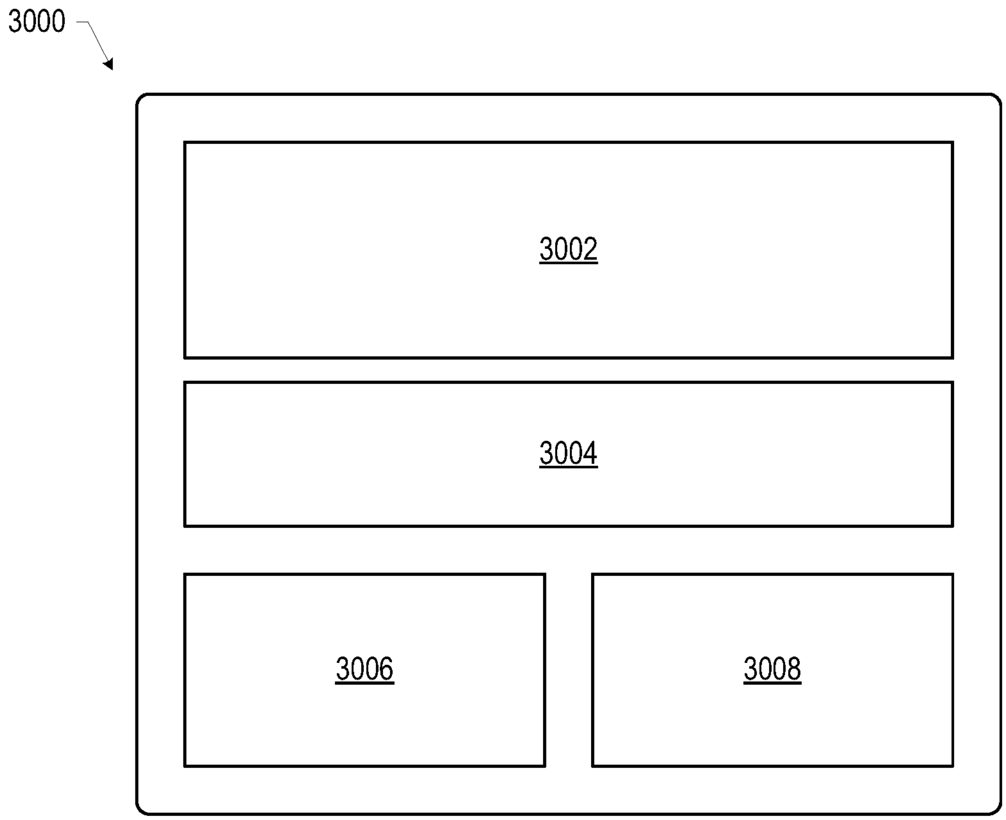
FIG. 4 is an example of a graphical user interface that may be used in the performance of some or all of the support methods disclosed herein, in accordance with various embodiments.

FIG. 4 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 5) of a computing device (e.g., the computing device 4000 discussed herein with reference to FIG. 5) of a scientific instrument support system (e.g., the scientific instrument support system 5000 discussed herein with reference to FIG. 6), and a user may interact with the GUI 3000 using any suitable input device (e.g., any of the input devices included in the other I/O devices 4012 discussed herein with reference to FIG. 5) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 4 is simply illustrative, and any number and arrangement of regions, including any desired features, may be included in a GUI 3000. Data representations like those of FIGS. 7, 8, and 9 may be included in any appropriate region of a GUI (e.g., in the data display region 3002 or the data analysis region 3004 of the GUI 3000)).

Figure 7:
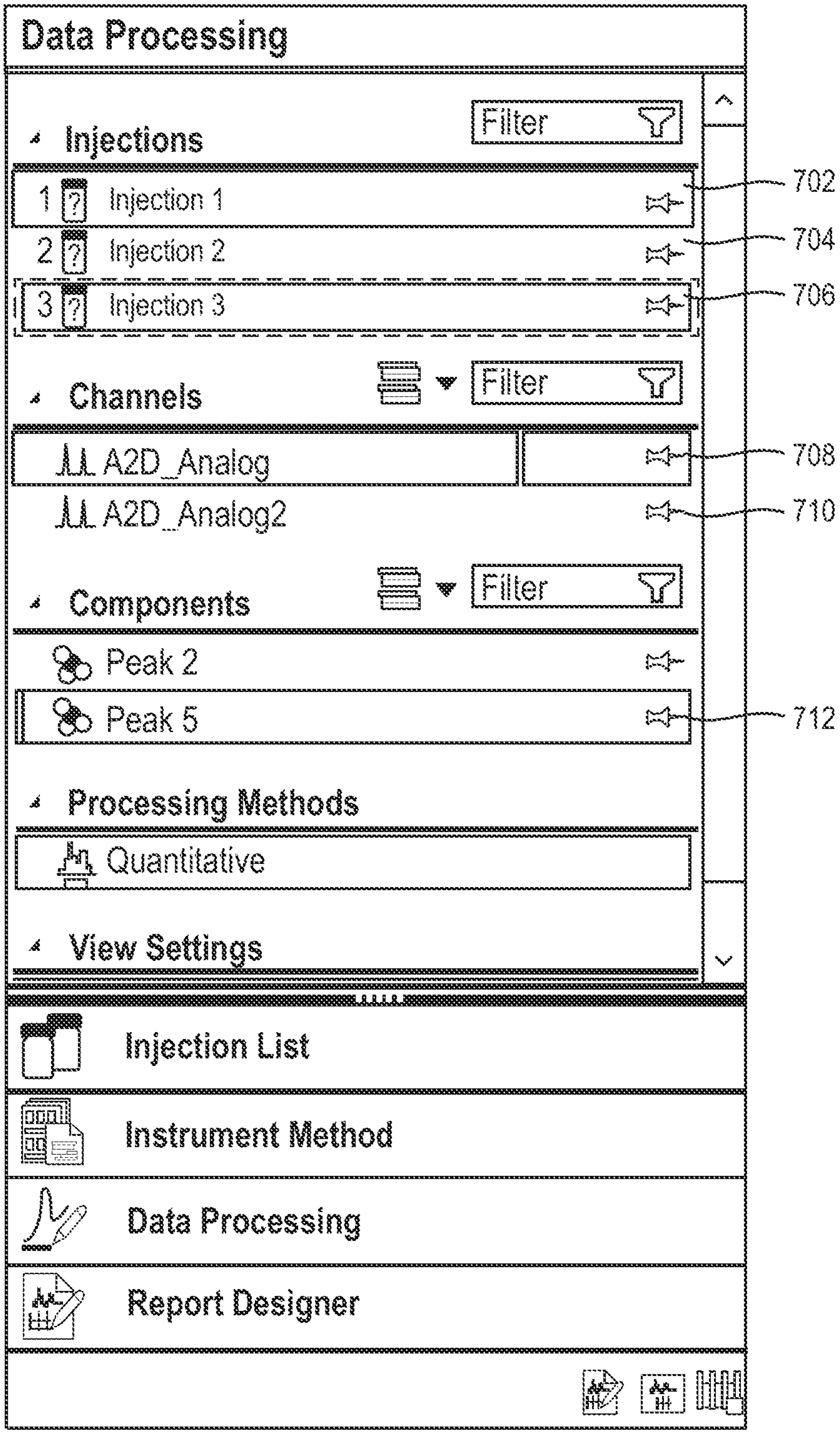

The data display region 3002 may display data generated by a scientific instrument (e.g., the scientific instrument 5010 discussed herein with reference to FIG. 6). For example, the data display region 3002 may display a list of injections performed, detector channel data collected, peaks identified, and processing methods used, such as shown in FIG. 7.

In various embodiments, GUI 3000 can highlight points of differences between analyses of the same chromatographic data using different parameters or algorithms. FIG. 7 illustrates a display highlighting which data is different between the two analyses. For example, a change in the quantitative method used can lead to changes in the resulting analyses of injection 702 and 706 but not in injection 704. Similarly, the change may only effect detector channel 708 and not 710 and may be specific to peak 712.

Figure 8A:
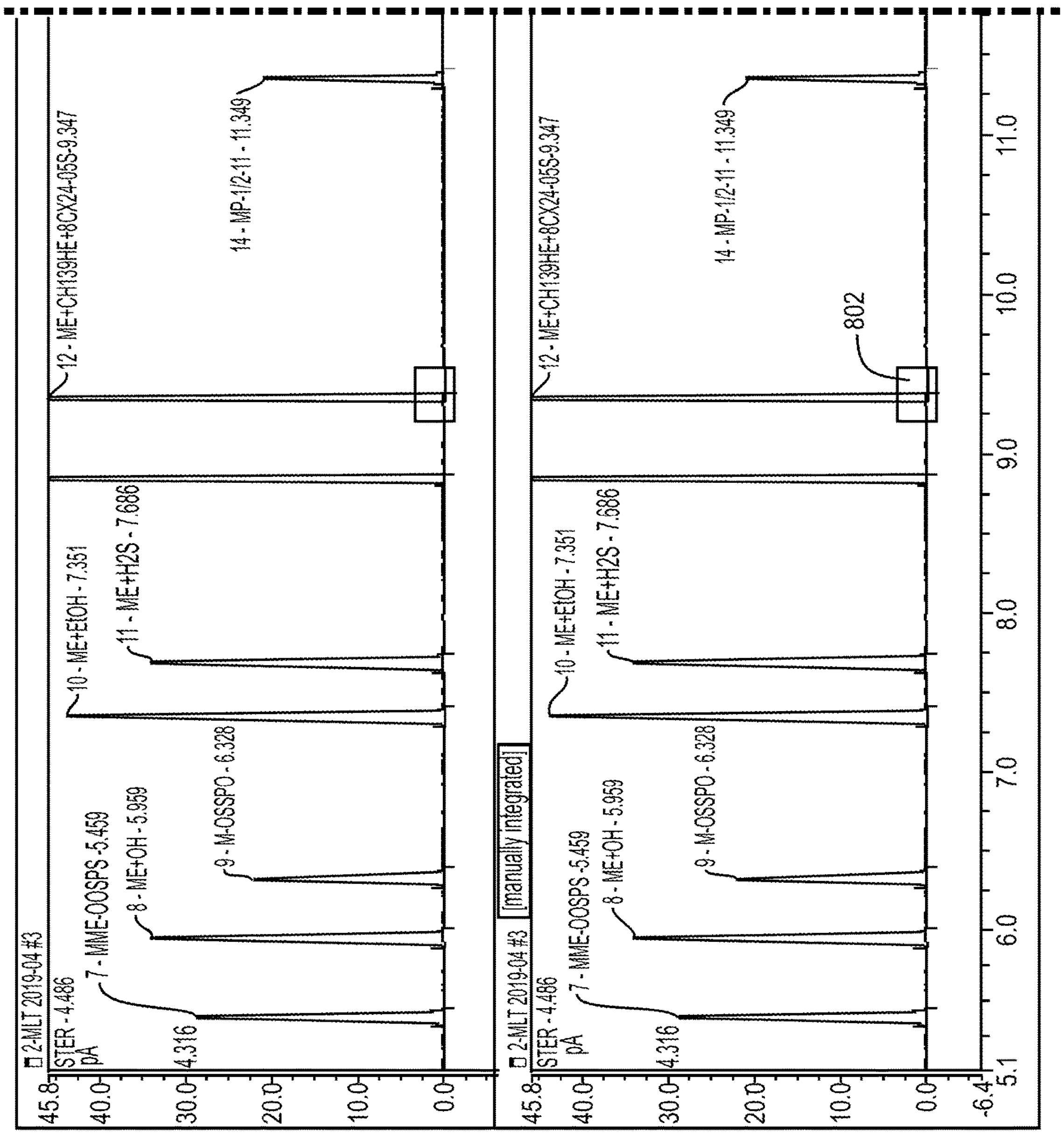
Figure 8B:
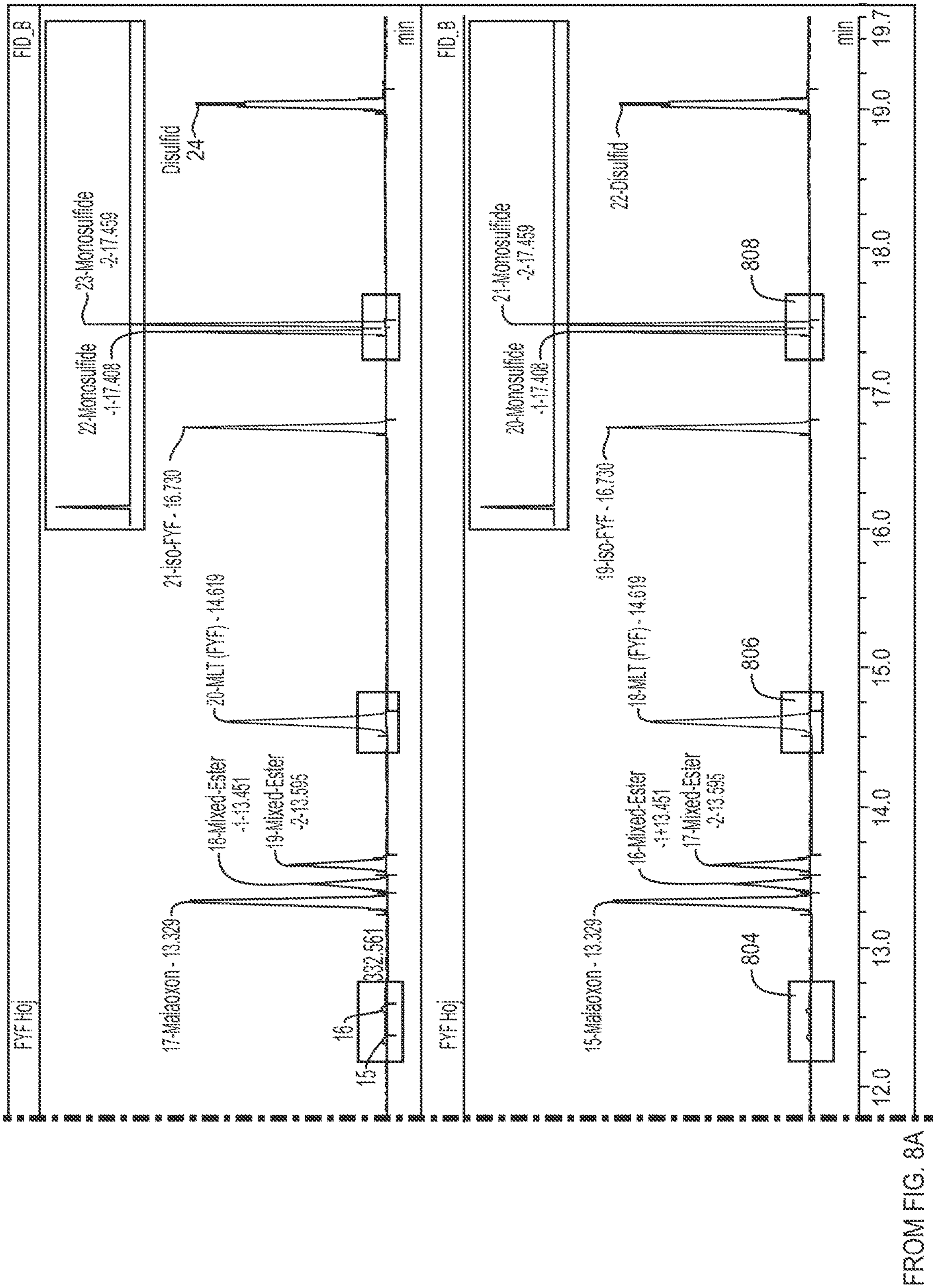

The data analysis region 3004 may display the results of data analysis (e.g., the results of analyzing the data illustrated in the data display region 3002 and/or other data). For example, data display region 3002 may display a chromatogram, such as shown in FIGS. 8*a* and 8*b*. Alternatively, the data analysis region 3004 may display a peak table, such as the peak table shown in FIGS. 9*a* and 9*b*. In some embodiments, the data display region 3002 and the data analysis region 3004 may be combined in the GUI 3000 (e.g., to include data output from a scientific instrument, and some analysis of the data, in a common graph or region).

FIGS. 8*a* and 8*b* illustrate a display indicating the difference between two chromatograms resulting from a change in parameters or algorithms used to analyze the data. Regions 802, 804, 806, and 808 can represent regions where differences have been identified.

FIGS. 9*a* and 9*b* illustrate a display indicating the difference between two component tables resulting from a change in parameters or algorithms used to analyze the data. Changes in the peaks detected can be identified by changes in font color and striking through lines where the peak is identified in one analysis but not the other, such as at 902 and 904. Changes in the quantitative values for a compound, such as at 906, can also be indicated by changes in font color or drawing a box around the result, such as at 908.

The scientific instrument control region 3006 may include options that allow the user to control a scientific instrument (e.g., the scientific instrument 5010 discussed herein with reference to FIG. 6). For example, the scientific instrument control region 3006 may include a listing of samples to the injected, a selection of methods to be performed, and the like.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 5, sending data to another user, labeling data, etc.). For example, the settings region 3008 may include choices of algorithms or parameters used during the analysis of the chromatographic data.

As noted above, the scientific instrument support module 1000 may be implemented by one or more computing devices. FIG. 5 is a block diagram of a computing device 4000 that may perform some or all of the scientific instrument support methods disclosed herein, in accordance with various embodiments. In some embodiments, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 6.

The computing device 4000 of FIG. 5 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 5, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE)

standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 6 is a block diagram of an example scientific instrument support system 5000 in which some or all of the scientific instrument support methods disclosed herein may be performed, in accordance with various embodiments. The scientific instrument support modules and methods disclosed herein (e.g., the scientific instrument support module 1000 of FIG. 2 and the method 2000 of FIG. 3) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the embodiments of the computing device 4000 discussed herein with reference to FIG. 5, and any of the scientific instrument 5010, the user local computing device 5020, the service local computing device 5030, or the remote computing device 5040 may take the form of any appropriate ones of the embodiments of the computing device 4000 discussed herein with reference to FIG. 5.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 5). The particular scientific instrument support system 5000 depicted in FIG. 6 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as a chromatographic system 100 in FIG. 1.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the scientific instrument support system 5000 illustrated in FIG. 6 may not be present. Further, in some embodiments, multiple ones of various ones of the elements of the scientific instrument support system 5000 of FIG. 6 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a scientific instrument support system 5000 may be different types of scientific instruments 5010; for example, one scientific instrument 5010 may be a chromatography system, while another scientific instrument 5010 may be a chromatography-mass spectrometry system. In some such embodiments, the remote computing device 5040 and/or the user local computing device 5020 may combine data from different types of scientific instruments 5010 included in a scientific instrument support system 5000.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A scientific instrument support apparatus, comprising:
- a memory that stores computer executable components;
- an injector comprising a sample loop or a concentrator column in which at least a portion of a sample is loaded;
- a column coupled to the injector and comprising a retention medium to retain one or more compounds of the sample;
- a detector coupled to an output of the column;
- a user interface disposed to output information from the scientific instrument support apparatus to an entity outside of the scientific instrument support apparatus and receive feedback from the entity outside of the scientific instrument support apparatus; and
- a processor that executes the computer executable components stored in the memory and that comprises:
  - a first logic, executed by the processor, to obtain one or more chromatographic data sets from a chromatographic system, each chromatographic data set of the one or more chromatographic data sets representing an injection of a sample and separation of the sample by chromatographic methods, wherein the sample is provided to the column by the injector;
  - a second logic, executed by the processor, to:
    - perform a first analysis of the one or more chromatographic data sets using a first set of algorithms and a first set of analysis parameters to generate a first result; and
    - perform a second analysis of the one or more chromatographic data sets using a second set of algorithms and a second set of analysis parameters to generate a second result; and
  - a third logic, executed by the processor, to:
    - identify differences between the first result and the second result; and
    - indicate, via the user interface, the one or more chromatographic data sets where the second result differs from the first result; and
    - display, via the user interface, to the entity outside of the scientific instrument support apparatus, one or more chromatograms representative of the indicated one or more chromatographic data sets and that visually identify features on the one or more chromatograms where the differences occur.

2. The scientific instrument support system of claim 1, wherein the first logic, the second logic, and the third logic are implemented by a computing device comprising the processor.

3. The scientific instrument support system of claim 1, wherein at least one of the first logic, the second logic or the third logic are implemented by a computing device comprising the processor and remote from the scientific instrument support apparatus.

4. The scientific instrument support system of claim 1, wherein at least one of the first logic, the second logic or the third logic are implemented by a user computing device comprising the processor.

5. The scientific instrument support system of claim 1, wherein at least one of the first logic, the second logic or the third logic are implemented in the scientific instrument support apparatus comprising the processor.

6. The scientific instrument support system of claim 1, wherein the user interface is further configured to display a first numeric result of the first analysis and a second numeric result of the second analysis in a single window and visually identify the differences.

7. The scientific instrument support system of claim 1, wherein the user interface displays data generated by the scientific instrument support system comprising a data display region that displays a list of injections performed, detector channel data collected.

8. The scientific instrument support system of claim 1, wherein the user interface displays data generated by the scientific instrument support system comprising a data display region that also displays peaks identified and processing methods used.

9. The scientific instrument support system of claim 1, wherein the user interface displays changes in quantitative values for a compound comprising the sample and wherein the changes are shown in font color or drawing a box around a result.

10. A computer-implemented method for scientific instrument support, comprising:
- obtaining, by a processor, one or more chromatographic data sets, each chromatographic data set of the one or more chromatographic data sets representing an injection of a sample and separation of the sample by chromatographic methods;

performing, by the processor, a first analysis of the one or more chromatographic data sets using a first set of algorithms and a first set of analysis parameters to generate a first result;

performing, by the processor, a second analysis of the one or more chromatographic data sets using a second set of algorithms and a second set of analysis parameters to generate a second result;

identifying, by the processor, differences between the first result and the second result;

indicating, by the processor, via a user interface, the one or more chromatographic data sets where the second result differs from the first result; and displaying, by the processor, via the user interface, one or more chromatograms representative of the indicated one or more chromatographic data sets and that visually identify features on the one or more chromatograms where the differences occur.

11. The computer-implemented method of claim 10, wherein the obtaining the one or more chromatographic data sets comprises instructing a chromatographic system to perform an analysis of one or more samples.

12. The computer-implemented method of claim 10, wherein the obtaining one or more chromatographic data sets comprises retrieving the one or more chromatographic data sets from a data storage.

13. The computer-implemented method of claim 10, wherein the user interface is further configured to display a first numeric result of the first analysis and a second numeric result of the second analysis in a single window and visually identify the differences.

14. One or more non-transitory computer readable media having instructions thereon that, when executed by one or more processors of a scientific instrument support apparatus, cause the scientific instrument support apparatus to perform a method comprising:

obtaining, by the one or more processors, one or more chromatographic data sets, each chromatographic data set of the one or more chromatographic data sets representing an injection of a sample and separation of the sample by chromatographic methods;

performing, by the one or more processors, a first analysis of the one or more chromatographic data sets using a first set of algorithms and a first set of analysis parameters to generate a first result;

performing, by the one or more processors, a second analysis of the one or more chromatographic data sets using a second set of algorithms and a second set of analysis parameters to generate a second result;

identifying, by the one or more processors, differences between the first result and the second result; and indicating, by the one or more processors, via a user interface, the one or more chromatographic data sets where the second result differs from the first result; and display, by the one or more processors, via the user interface, one or more chromatograms representative of the indicated one or more chromatographic data sets and that visually identify features on the one or more chromatograms where the differences occur.

15. The one or more non-transitory computer readable media of claim 14, wherein the obtaining the one or more chromatographic data sets comprises instructing a chromatographic system to perform an analysis of one or more samples.

16. The scientific instrument support system of claim 1, wherein the first analysis or the second analysis comprises determining baselines, applying smoothing, detecting peaks, integrating peaks or performing peak matching.

17. The one or more non-transitory computer readable media of claim 14, wherein the user interface displays a data analysis region and a data display region combined with one another concurrently on the user interface.

18. The scientific instrument support system of claim 17, wherein the combination includes data output from the scientific instrument support system and analysis of the data in a common graph or region.

19. The scientific instrument support system of claim 17, wherein the combination includes data output from the scientific instrument support system and analysis of the data in a common graph or region.

20. The one or more non-transitory computer readable media of claim 14, wherein the user interface displays a difference between two component tables resulting from a change in parameters used to analyze the chromatographic data sets.

21. The scientific instrument support system of claim 14, wherein changes in peaks detected are shown by changes in font color and striking through lines where the peak is identified in one of the two component tables but not in the other of the two component tables.

* * * * *